United States Patent [19]
Boone et al.

[11] Patent Number: 5,953,452
[45] Date of Patent: Sep. 14, 1999

[54] OPTICAL-DIGITAL METHOD AND PROCESSOR FOR PATTERN RECOGNITION

[75] Inventors: Bradley G. Boone; Oodaye B. Shukla, both of Columbia, Md.

[73] Assignee: The Johns Hopkins University, Baltimore, Md.

[21] Appl. No.: 07/972,279

[22] Filed: Nov. 5, 1992

[51] Int. Cl.⁶ .............................. G06K 9/46; G06K 9/74; G06K 9/80
[52] U.S. Cl. .......................... 382/199; 382/212; 382/278
[58] Field of Search .................................. 382/42, 32, 16, 382/19, 14, 22, 25, 278, 212, 199, 214; 359/561, 227, 230, 232, 234, 236, 618, 619; 364/822

[56] References Cited

U.S. PATENT DOCUMENTS

| | | | |
|---|---|---|---|
| 3,394,347 | 7/1968 | Crane | 382/214 |
| 4,862,511 | 8/1989 | Peppers et al. | 382/214 |
| 5,101,270 | 3/1992 | Boone et al. | 382/278 |

OTHER PUBLICATIONS

Levine, Martin D. "Vision in Man and Machine." McGraw–Hill, 1985, p. 518.

*Primary Examiner*—Jon Chang
*Attorney, Agent, or Firm*—Francis A. Cooch

[57] ABSTRACT

The invention is an optical-digital method and processor which uses micro-optical lenslet arrays and fixed masks to implement an angular correlation algorithm and the Hough transform for extracting amplitude and geometric features from objects embedded in video imagery. The optical-digital processor can be interfaced to a variety of sensors and can be used to classify objects when used in conjunction with a neural network.

16 Claims, 11 Drawing Sheets

Radius vs. angle (radians)

FIG.3B

Radius vs. angle (radians)

OPTICAL-DIGITAL METHOD AND PROCESSOR FOR PATTERN RECOGNITION

STATEMENT OF GOVERNMENTAL INTEREST

This invention was made with Government support under contract N00039-91-C-0001 awarded by the U.S. Navy Department. The Government has certain rights in this invention.

BACKGROUND OF THE INVENTION

The present invention relates generally to optical-digital signal processing systems, and, in particular, to systems that extract features from optical images for pattern recognition.

Optics and pattern recognition are key areas for systems development for many applications, including tactical missile guidance, strategic surveillance, optical parts inspection, medical imaging and non-destructive evaluation. Both passive imaging sensors (infrared (IR) and visible) and active microwave imaging sensors have been employed in many systems to date, but pattern recognition solutions in conjunction with these sensors are highly application dependent and have required extensive training. These factors have precluded extensive development.

Pattern recognition using imaging sensors can be implemented by means of feature extraction. Generally speaking, optical processing offers a fast and highly parallel method of feature extraction and correlation using the fundamental properties of wavefront multiplication, addition, rotation, and splitting. On the other hand, one of the key concerns in the design of optical feature extractors is that the features selected for pattern recognition should be invariant with respect to position, scale, and rotation, which simple image correlators are particularly sensitive to in most cases. Furthermore, traditional approaches have involved complicated mathematical transformations to achieve distortion invariance.

As will be described in more detail below, the invention offers a compact, distortion-insensitive method of optical feature extraction using primitive image operations such as image replication, multiplication, integration, and detection, and is useful in viewing objects in plan-view. One of the key aspects of this approach is the use of optical feature extraction to measure objects rather than match them. Matching is left to a neural network.

SUMMARY OF THE PRESENT INVENTION

As noted previously, the present invention is directed generally at optical-digital signal processing systems that extract features from optical images for pattern recognition purposes and, in particular, relates to a method and processor for generating angular correlation and the Hough transform of sensor input images using optical signal processing techniques. The optical-digital processor of the invention implements the optical Radon (Hough) transform and a specially developed optical angular correlation technique, followed by appropriate numerical processing, and a neural net classifier to extract all the basic geometric and amplitude features from objects embedded in video imagery.

The angular correlator is a unique development that enables object symmetry, orientation, primitive dimensions and boundary to be estimated. In addition to circumventing scale and rotation distortions, the features derived from the angular correlation technique are relatively insensitive to tracking shifts and image noise. Along with the well-developed Hough transform, which provides information on the internal structure of objects, these features collectively describe most simple closed-boundary objects in an elegant and compact way, thus affording generic object measurement and the prospect of effective object classification. The only major requirements for this processor are that the input imaging sensor employ detection with adaptive thresholding and centroid tracking, both of which are common (or easily implemented) attributes of most imaging sensors.

A general object of the invention is, thus, to provide an improved method and apparatus for image processing.

Another object of the invention is to provide an optical-digital processor for object measurement that can be interfaced to a variety of sensors, including imaging IR, optical machine vision systems and synthetic aperture radar (SAR), as well as used in conjunction with a neural network algorithm to classify objects.

Another object of the invention is to provide an improved optical processor for performing angular correlation and the Hough transform of sensor input images, using micro-optical lenslet arrays and fixed masks, thus, obviating the need for moving parts.

Other objects, purposes and characteristic features of the present invention will be pointed out as the description of the invention progresses and will also be obvious from the accompanying drawings, wherein:

BRIEF DESCRIPTION OF THE DRAWINGS

FIG. 2, consisting of FIGS. 2(a), 2(b) and 2(c), illustrates various outputs of the angular correlation method of the invention where the object being measured is an ellipse.

FIG. 3, consisting of FIGS. 3(a) and 3(b), illustrates objects and boundary functions of shapes with re-entrant and multiple boundaries, respectively.

FIG. 4, consisting of FIGS. 4(a) and 4(b), illustrates a reconstruction of the objects of FIG. 3 using angular and annular correlation.

DETAILED DESCRIPTION OF THE PREFERRED EMBODIMENT

Figure 1:
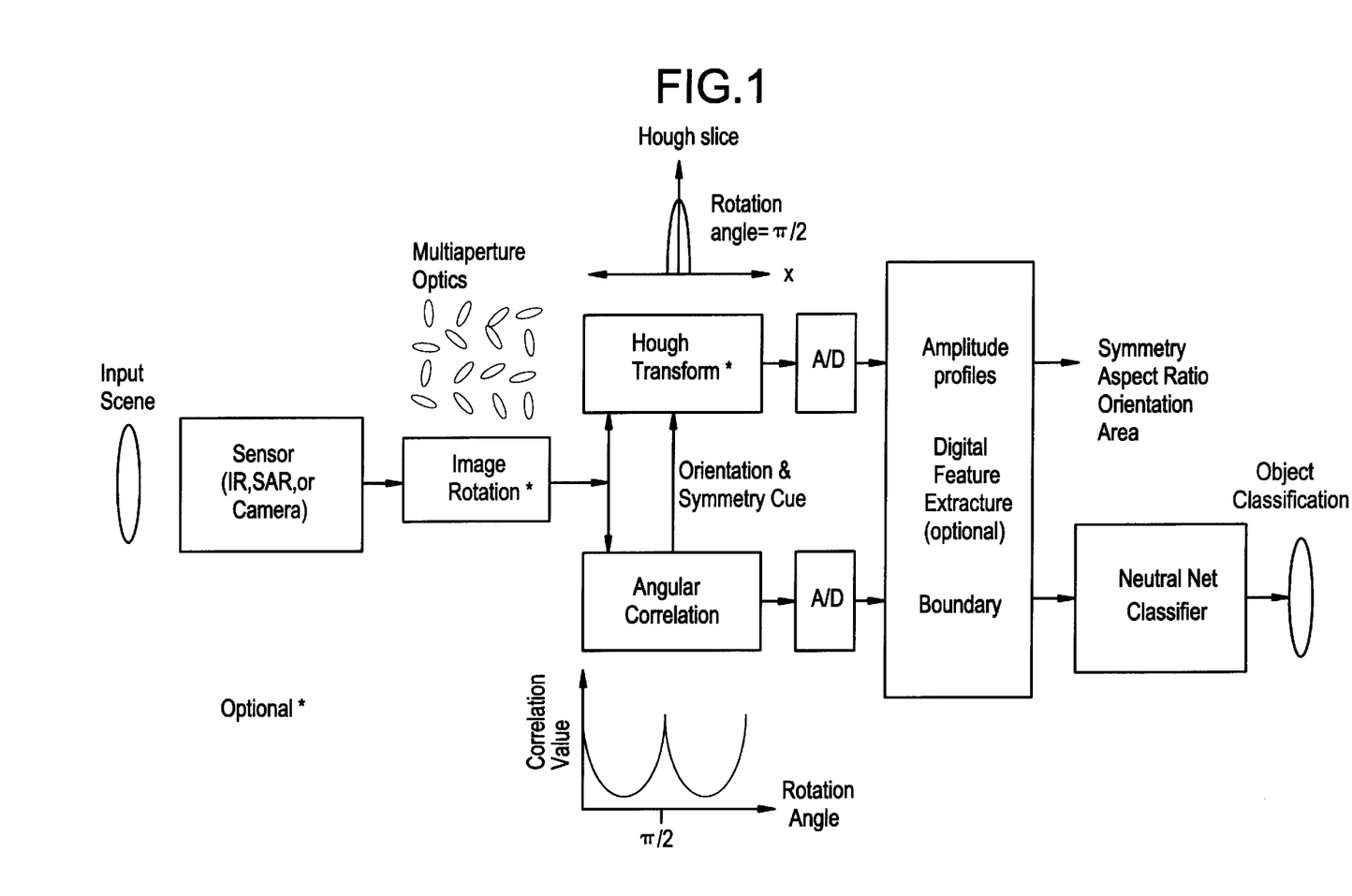
FIG. 1 is a block diagram of an embodiment of the optical-digital processor architecture of the invention.

The key components of the optical-digital processor of the invention are laid out in FIG. 1. Basically, the overall system consists of four stages: an optical interface to an appropriate sensor display or entrance optics, optical processor for angular correlation and (optional) Hough transform, digital processor for calculating various features of the object data, and finally, a digital or analog neural network for classification. Due to the use of a fixed mask as described herein for the preferred embodiment, image rotation is unnecessary to implement the angular correlation algorithm. However, in the absence of a fixed mask in the optical processor, multi-aperture optics (space-multiplexing) in the form of a combination of a lenslet array and dove prisms in the optical interface can be used to rotate the input image.

Many kinds of correlation algorithms have been implemented for pattern matching applications. Most correlation algorithms shift one image with respect to the other while calculating the area of overlap. The angular correlation algorithm of the invention simply calculates the area of overlap versus the angle between the overlapped images. The resulting set of correlation values can be used to recover the boundary of an object if the object is thresholded and binarized and the other object is a slit.

Since the angular correlation algorithm uses rotation, the need for rotational invariance is obviated. Scale invariance is irrelevant to angular correlation because it measures an object. The optical implementation of the invention uses incoherent light (allowing the use of standard camera optics or video displays as image inputs) and multi-aperture optics (lenslet array) (making it light-weight and compact using off-the shelf components).

Primitive features of an object can also be determined by using angular correlation. Object primitives include: area, length, width, aspect ratio, symmetry, and orientation. For most simple objects periodicity of the boundary is directly related to symmetry. For a square (which has four-fold symmetry), the periodicity is $\pi/2$ ($2\pi/4$), whereas for an equilateral triangle (three-fold symmetry), the periodicity is $2\pi/3$. With the object centered, the peak values of the recovered boundary are related to the maximum extent of the object. The minimum value of the boundary curve is the minimum dimension of the object through its centroid. Taking the ratio of the maximum and minimum values of the recovered boundary yields the aspect ratio of a simple two-fold symmetric object like a rectangle or an ellipse. The minimum value of the recovered boundary curve (or "bias") is also a measure of the image "mass" concentration of the object about its centroid. For example, the boundary of a star shaped object is a set of periodic peaks with a lower bias than the boundary of a square which has more image "mass" at its center (see FIG. 5).

Figure 2A:
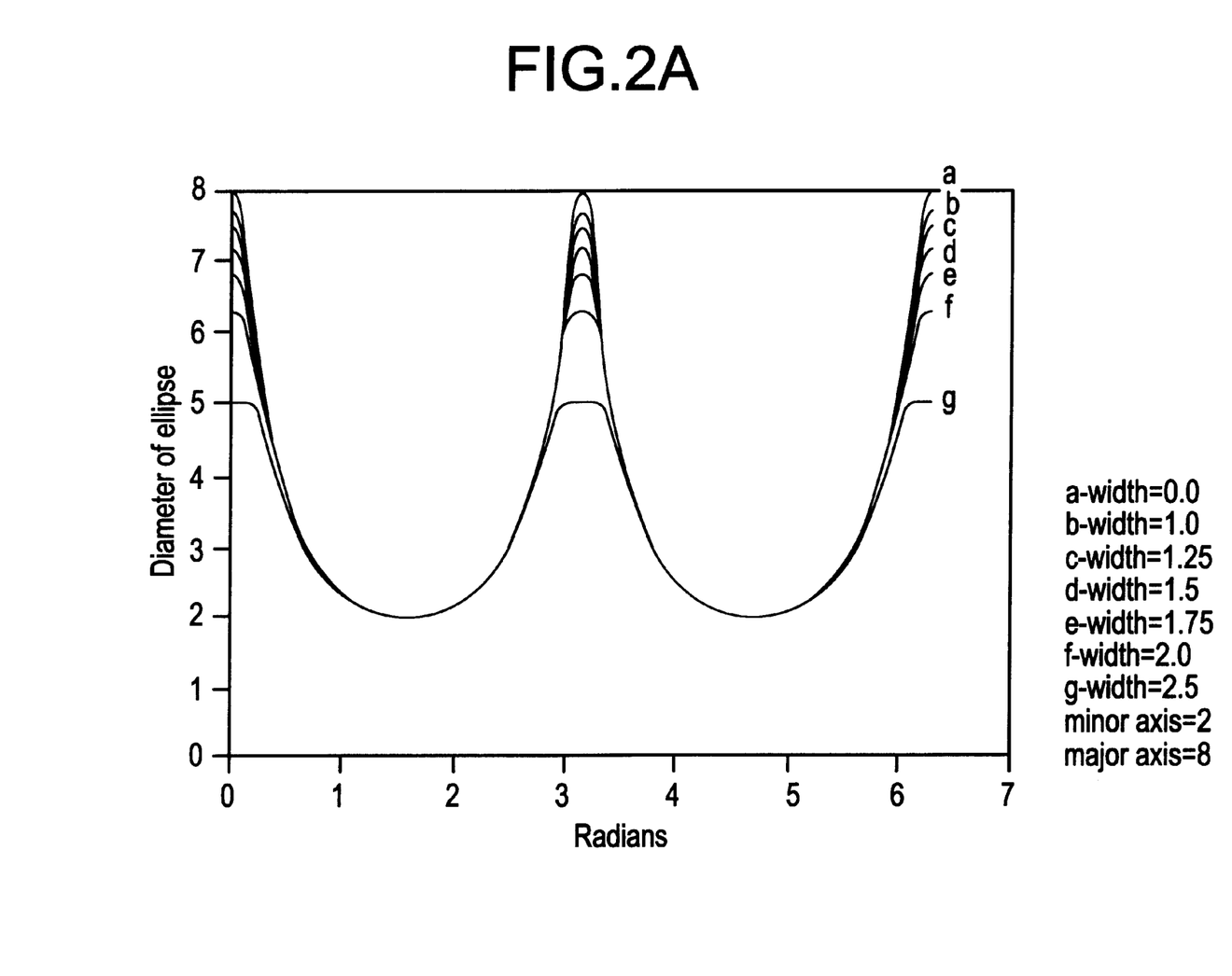

For angular correlation, both objects have to be centered with respect to a common origin. In that case the maximum correlation value gives the cue for selection of an optimal Hough transform slice. The peak correlation values for offset slits are less than the peak correlation value of a slit with no offset as shown in FIG. 2(a). Even for large offsets the periodicity and optimum cueing angle remain unchanged. Thus, a key assumption necessary for implementing this algorithm digitally or optically is that the object be centroid tracked, something often achieved in practice with imaging sensors and good tracking systems.

Consider the angular cross-correlation of a slit (extending over the entire image) with an ellipse in more detail. When the slit and the major axis of the ellipse are oriented horizontally, the area of overlap is approximately the width of the slit multiplied by the major axis of the ellipse. By decreasing the slit width, the intersecting area approaches the length of the major axis of the ellipse. As the slit is rotated, the area of overlap is the boundary of the object at the slit angle. Angular cross-correlation for binarized images can then be expressed mathematically as:

$$R(\theta) = \int_0^{2\pi} \int_0^{\infty} rect\left[\frac{r}{r(\theta')}\right] rect\left[\frac{r}{r_{rect}(\theta' + \theta)}\right] rd\,rd\theta' \quad (1)$$

where $rect[r/r_{rect}(\theta'+\theta)]$ is a functional description of a rectangular slit rotated by an angle $\theta$, and $rect[r/r(\theta')]$ is the corresponding description for the desired object.

Ideally, the slit width should approach zero to recover the exact boundary of an object, but in practice a finite signal must be measured. The minimum sampling angle necessary to sample the boundary of an object and to satisfy the Nyquist sampling criterion can be calculated by examining the Fourier spectrum of the boundary function to obtain the cutoff frequency. Then the appropriate slit width can be determined from this using simple geometry. Essentially this means that complex binarized objects should be cross-correlated with a slit one pixel wide.

Figure 2B:
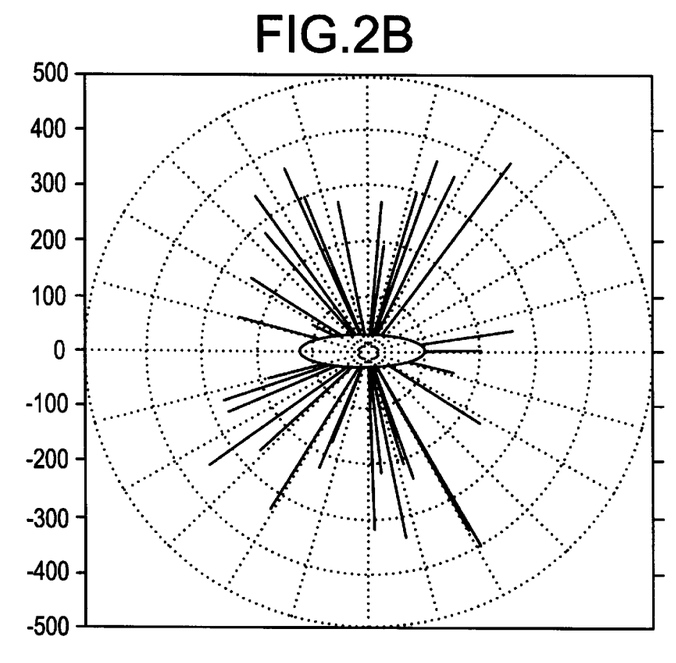
Figure 2C:
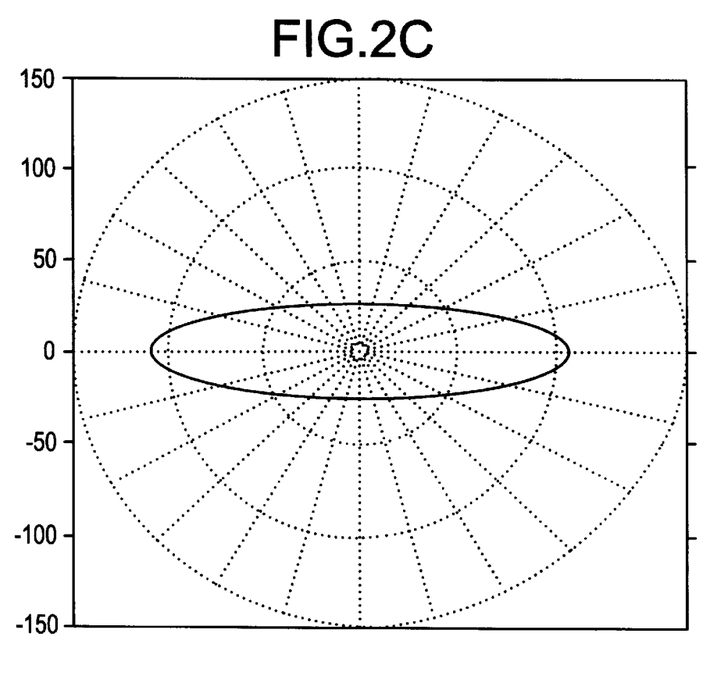

In the preferred embodiment of the invention, the slit is rotated using a fixed mask while the image remains fixed. If the image is noise-free, then the boundary recovered is exact. However, if the image is extremely noisy, then the recovered boundary will have spikes on it as shown in FIG. 2(b). A noisy boundary can be filtered to recover the smooth boundary by using the Nyquist bandwidth of the boundary function to set a low-pass filter cutoff (or by using a first-forward difference with a limiting threshold as was done for FIG. 2(c)).

Figure 3A:
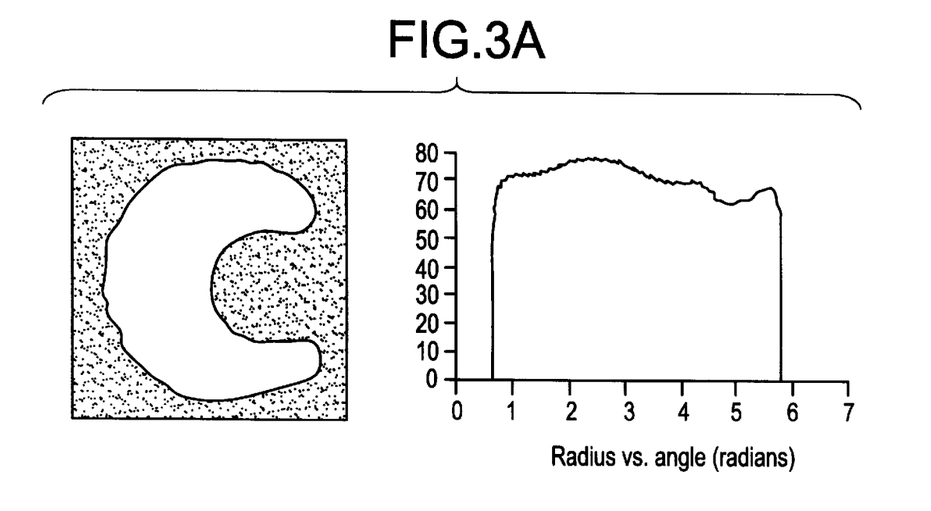
Figure 3B:
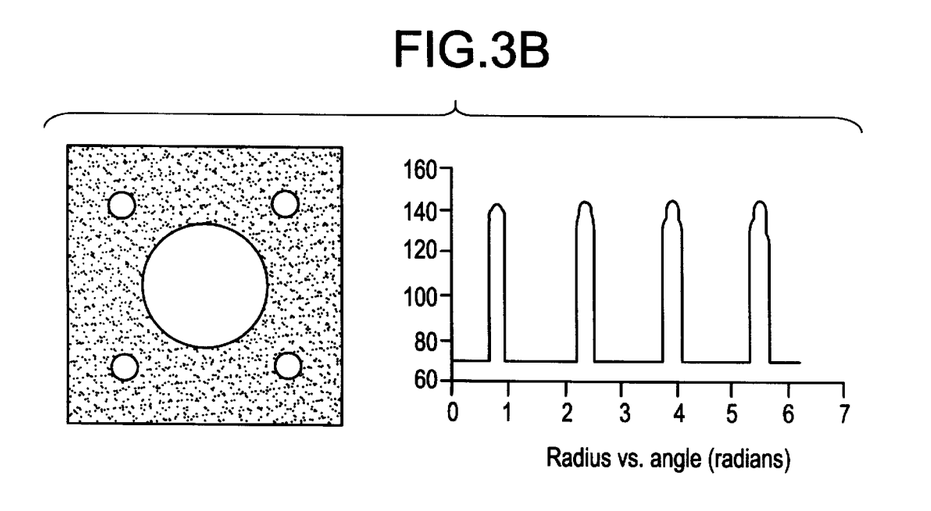

The angular correlation algorithm is effective on simple convex shapes, such as rectangles, triangles, ellipses, and circles, and some concave shapes such as stars and gears. Objects that do not have simple closed boundaries are those with re-entrant boundaries and multiple boundaries, as shown in FIG. 3. For objects with such boundaries, the estimated boundary recovered by angular correlation will not necessarily enable it to be discriminated from other (simpler) boundaries because only the total area of overlap is recovered. In other words, the area of overlap between the slit and object is a single value that does not contain any information about boundaries within the slit.

Figure 4A:
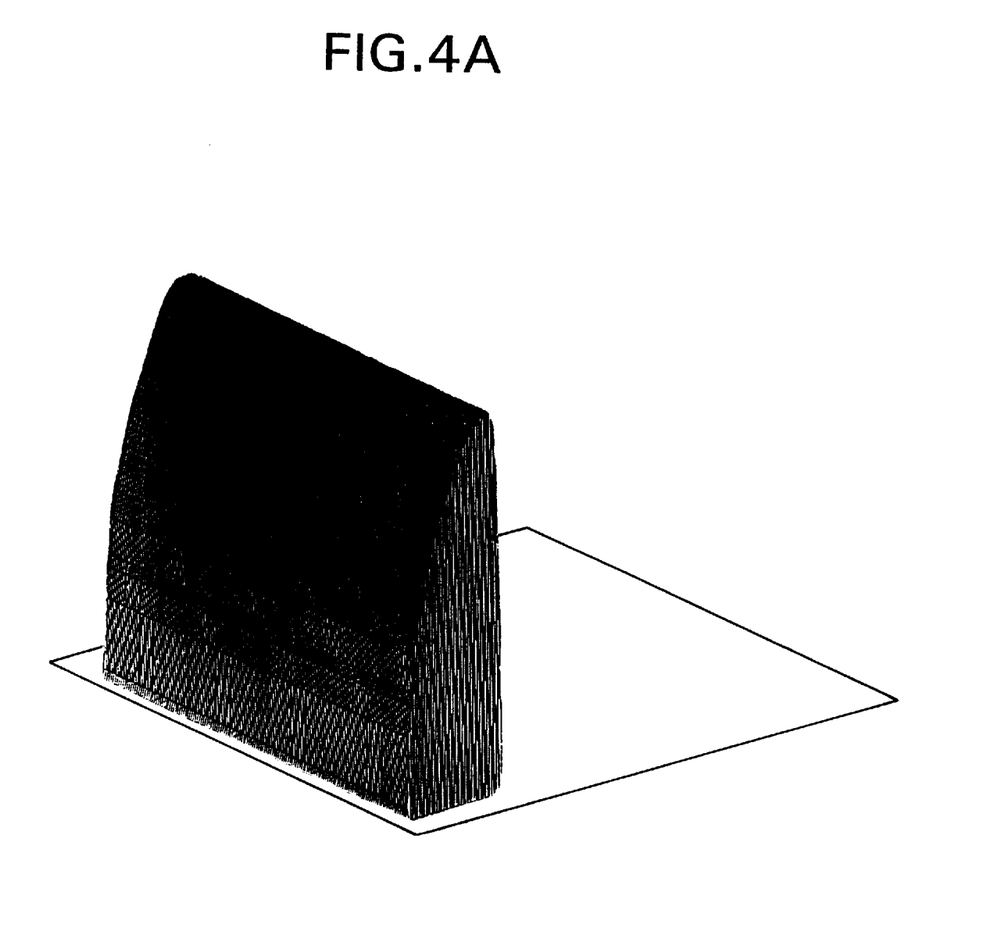
Figure 4B:
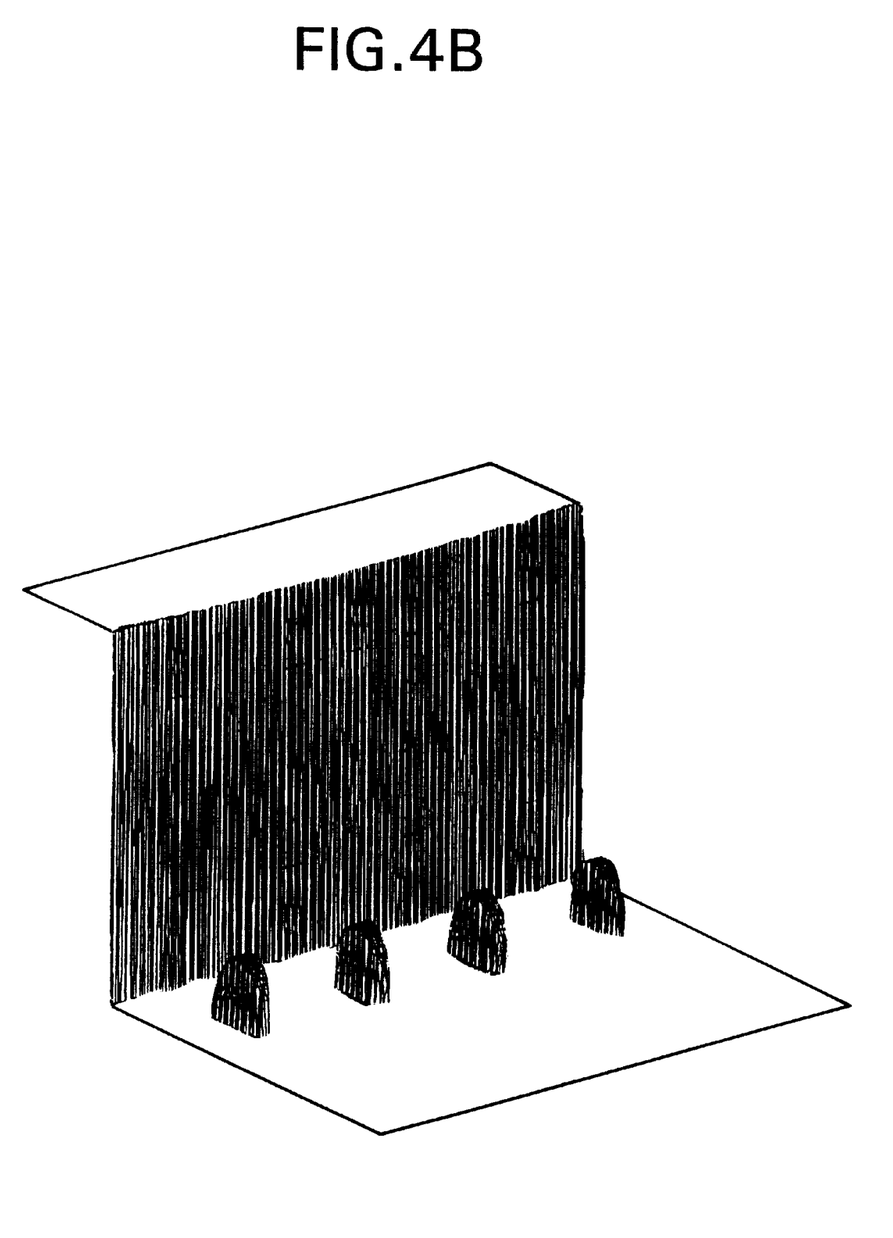
Figure 5A:
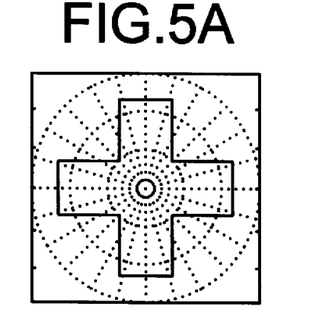
Figure 5B:
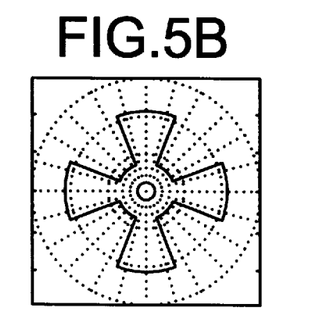
FIG. 5, consisting of FIGS. 5(a) through 5(p), illustrates object boundaries recovered by angular correlation.
Figure 5C:
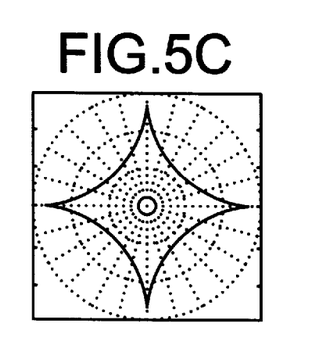
Figure 5D:
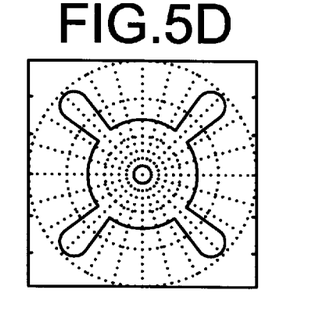
Figure 5E:
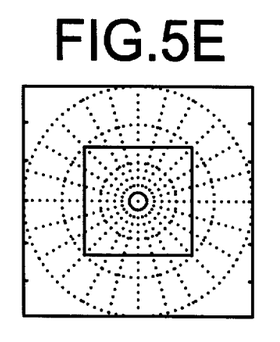
Figure 5F:
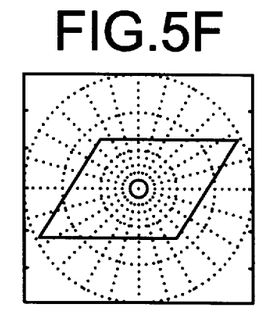
Figure 5G:
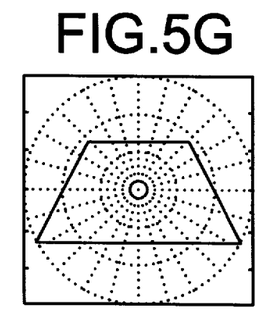
Figure 5H:
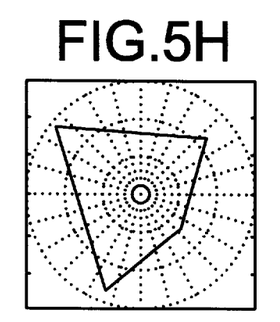
Figure 5I:
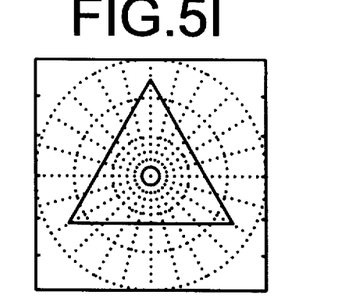
Figure 5J:
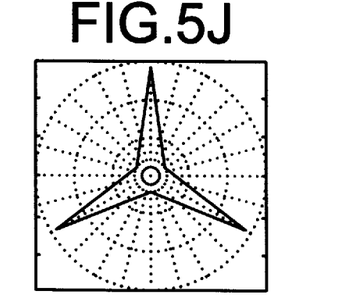
Figure 5K:
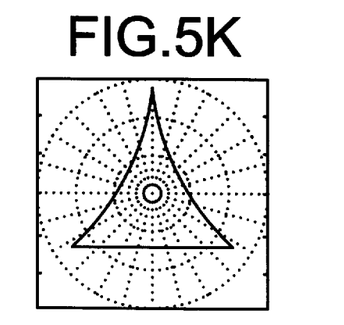
Figure 5L:
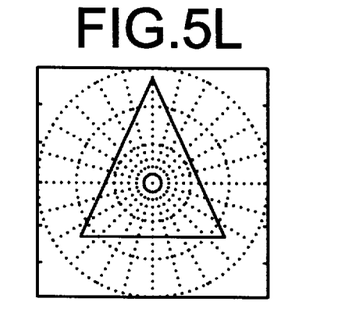
Figure 5M:
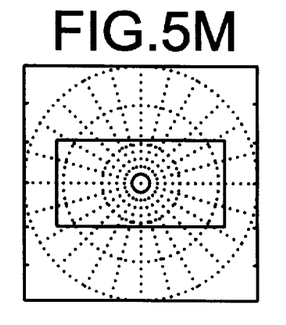
Figure 5N:
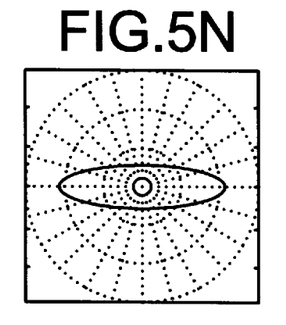
Figure 5O:
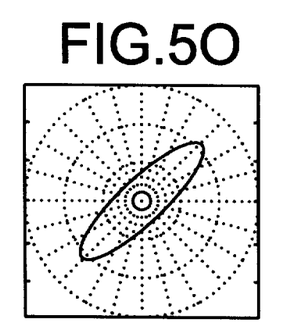
Figure 5P:
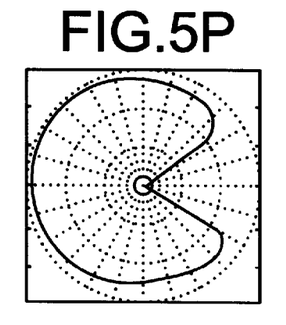

The Hough (or Radon) transform is a well known mathematical transform used in image processing to reconstruct objects (and which helps resolve the above problem). The Hough transform is a collection of 1-D projections. For each angle $\theta$, an object's amplitude projection is obtained by integration perpendicular to the p-axis (which is the x-axis rotated by $\theta$). The complete Hough transform is given by:

$$F_R(p, \theta) = \int_{-\infty}^{\infty} \int_{-\infty}^{\infty} f(r)\delta(p - r \cdot n)d^2r \quad (2)$$

where the 2-D object is defined by the function f(r) and n is the unit vector normal to the p-axis. The (p,$\theta$) coordinates represent Hough space. An interesting connection can be drawn between the Hough transform and correlation. If, instead of calculating the angular correlation, we calculate the annular correlation, i.e.:

$$R(r) = \int_0^{r_m} \int_0^{2\pi} f(r, \theta) rect\left(\frac{r' + r}{r_o}\right) r'\,dr'\,d\theta \quad (3)$$

a result can be obtained that is equivalent to the Hough transform averaged over all $\theta$. For simple 2-fold symmetric objects (like a rectangle or ellipse) embedded in backgrounds that can be well-thresholded the result is very nearly the same as a single optimal Hough slice. This result is particularly useful for recovering the re-entrant and multiple-boundary objects mentioned earlier. The combined annular correlation (Hough transform) and angular correlation yield the correct reconstructions for these two cases as shown in FIGS. 4(a) and (b).

The Hough transform can also be used to classify objects compared with or without angular correlation, especially 2-fold symmetric objects. If angular correlation is used, the angle corresponding to maximum correlation is used to determine the orientation of the object containing the maximum information from the Hough transform. The internal amplitude profile of the object along this orientation is usually the optimal Hough transform slice. Given the orientation and the corresponding profile of an object (or its Fourier components), classification algorithms have been used to identify the object. Primitive features of the object such as length, width, and aspect ratio and orientation derived from angular correlation have also been used along with the Hough transform to improve neural net classification rates.

Before implementing the angular correlator optically, it is useful to simulate it on a computer using a set of simple synthetic geometric objects shown in FIG. 5. These objects were chosen to include four-fold, three-fold, and two-fold objects as well as an object with multiple boundaries (FIG. 5(d)) and an object with a re-entrant boundary (FIG. 5(p)). For objects with multiple boundaries, the recovered boundary curve shows the outline of all the objects but not the boundaries between distinct constituent objects. The four-fold objects were chosen to compare shapes with differing image "mass" concentrations (square, plus-sign, rotor, and star) and perturbations from a square (trapezoid, parallelogram, and quadrilateral). The three-fold objects were arranged to compare on the basis of image "mass" concentrations (triangle and three-pointed star) and evidence of bilateral symmetry (isosceles triangle and triangle with concave sides). The two-fold objects were chosen to reflect differences in boundary frequency content (rectangle versus ellipse) and phase (ellipse versus rotated ellipse). For the object with the re-entrant boundary, the angular correlation algorithm recovers a straight line approximation of the interior concave sides (FIGS. 3(a) & 5(p)). For the multiple boundary object (five circles), the correlation algorithm does not detect disjoint boundaries (FIGS. 3(b) & 5(d). In these two cases, the recovered boundary from the angular correlation algorithm is not sufficient to calculate the exact primitive features of the object or objects within the image. However, as stated before, the Hough transform may be used to recover the internal structure of these objects. Otherwise boundaries of the remaining objects are recovered successfully.

The angular correlator and the Hough transformer can be implemented optically in two basic architectures: time multiplexing (video feedback) or space multiplexing (multiple lenslet arrays). Although the video feedback approach was first implemented as described and claimed in U.S. Pat. No. 5,101,270, issued May 7, 1992, which is incorporated herein by reference, a new and preferred implementation is a multi-aperture micro-optical architecture.

Figure 6:
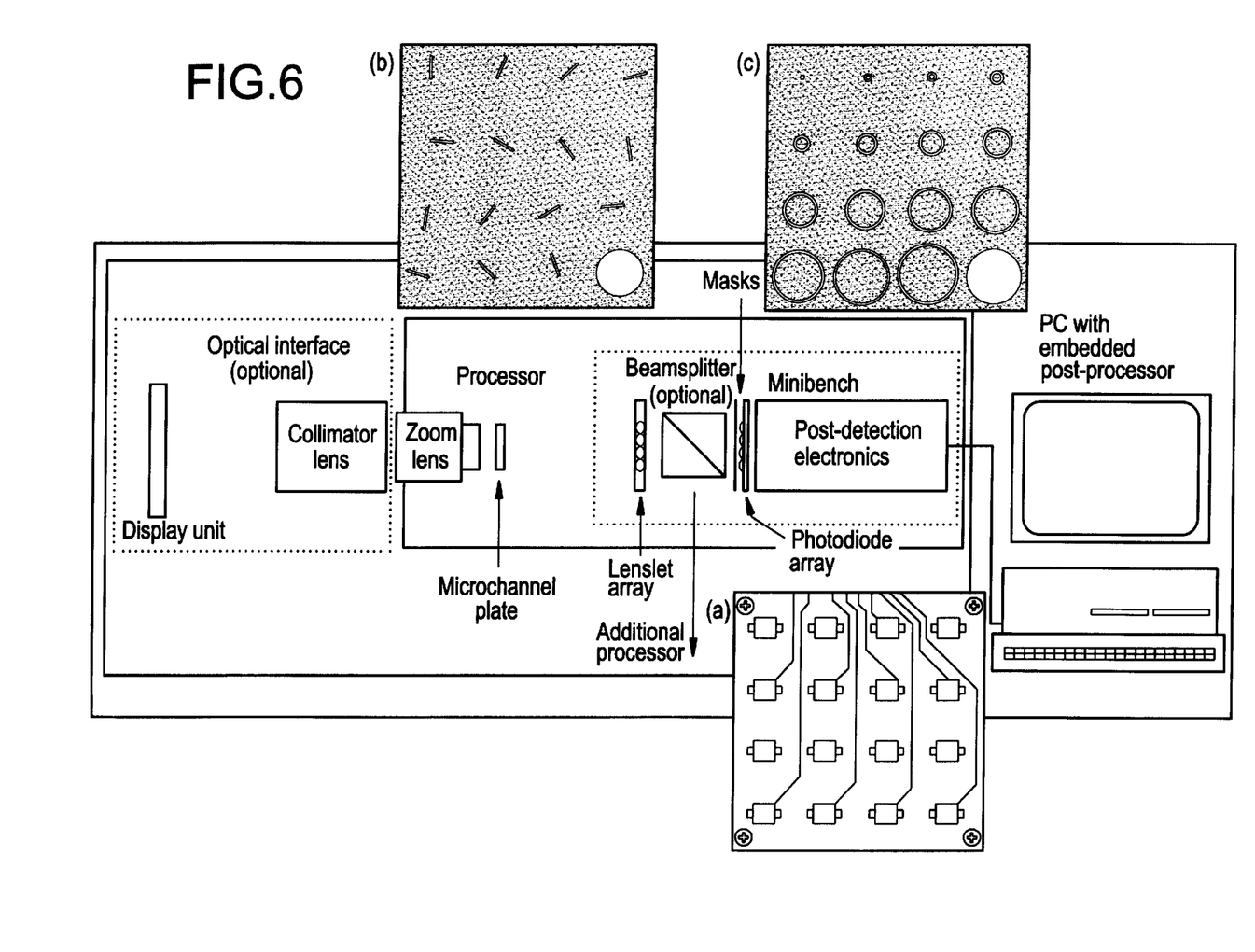
FIG. 6 illustrates a hardware layout of an embodiment of the invention.

A multi-aperture optical system to optically rotate an image, calculate its Hough transform and recover its boundary using angular correlation is shown in FIG. 6. This embodiment includes a video display and collimating lens that serve as the optical interface to represent object space. The actual optical processor is preceded by a zoom lens and (optical) microchannel plate. The microchannel plate forms a real image to be replicated by the multi-lenslet array. It can also be used in a saturated mode to binarize the object. Alternatively the original video display can project through (as a virtual object), or a fiber optic window or binarizing spatial light modulator can be used to create a displayed image.

The replicated images are passed through a fixed mask onto a multiple detector array as shown in FIG. 6 (inset(a)). Each detector spatially integrates the superposition of each replicated image and the corresponding mask pattern. For angular correlation the mask consists of a series of rotated half-plane slits as shown in FIG. 6(inset(b)). For annular correlation (θ-averaged Hough transform) it is a series of annuli as shown in FIG. 6 (inset(c)).

Ordinarily, in order to implement the Hough transform, the image has to be rotated. Previous optical architectures use mechanical rotation schemes, but mechanical devices have reliability problems and will always be a throughput bottleneck. Replicating the image optically and rotating either the images optically or the pattern elements of the processor mask will substantially increase the throughput and reliability. Other functions can also be performed, such as tracking, using simple mask patterns.

The detector outputs are then preamplified, filtered, multiplexed and A/D converted to input into a PC-hosted neural network algorithm that uses the boundaries obtained by angular correlation for classification.

Some of the applications well suited for a neural network classifier based on angular correlation algorithm include optical parts inspection, machine vision, non-destructive evaluation, medical imaging, strategic surveillance, and tactical missile guidance. For missile guidance, a neural network classifier can be employed in a SAR sensor to recognize targets such as ships. In strategic surveillance, the angular correlator can be mated to one of several different sensors which include optical, infrared, SAR, or microwave radiometric sensors. For non-destructive evaluation, the patterns contained in the surface morphology of the test object can be measured using the angular correlator and primitives derived from it. In the area of medical imaging the growth, shape and size of retinal lesions can be measured and tracked over time using this algorithm to recover the boundary of the diseased area. In machine vision, a robot can use this algorithm to recognize, avoid, or manipulate objects using boundaries.

For optical parts inspection, parts traveling down a conveyor belt can be imaged and replicated through the optical interface to extract their boundaries and then sent to the neural network. The neural network matches the part's boundary to one of the stored boundaries. Further action may be taken depending on whether there is a match or not, such as sorting. The parts inspection or sorting task is a well-constrained task. The placement and orientation of the moving parts can be well defined and the boundaries of the parts are well-known. The boundaries can be thresholded to obtain the best match and stored in the pattern matrix. The simplicity of this design makes this correlator compact, reliable and suitable for the factory environment. In this correlator, the throughput is limited by the electronics used to scan the detector array and the neural network. The detector array can be scanned on the order of microseconds and the processing time of the network can be on the order of 100 microseconds for a winner-take-all, analog, associative memory neural network. Thus the correlator should be able to classify objects on a conveyor within 100–200 microseconds, thus making it suitable for fast conveyors.

Thus, the invention consists of a method and apparatus that can be used to obtain the boundary of an object. From the boundary, the object can be recognized using a neural network which matches the object boundaries with stored boundaries. The angular correlation algorithm can be easily implemented using multi-aperture optics to replicate the input object and cross-correlate it with a series of rotated slits. This implementation is well-suited to interface with the neural network for classification. With multiple thresholds, the boundary curves can be undersampled and still be recognized by the neural network. Even modified or perturbed objects can be identified using multiple thresholds. The boundary of the object is derived optically in parallel almost instantaneously, and the throughput is limited to less than 100–200 microseconds by the read-out electronics and the neural network classifier. One of the many applications for this hybrid processor is optical parts inspection where a set of objects with known boundaries can be matched to the stored boundaries.

We claim:

1. A method for extracting the boundary of an object in a sensor input image comprising the steps of:

overlapping a slit and the object in the sensor input image;

rotating the slit relative to the object, the slit thereby sampling the entire boundary of the object; and calculating for each rotation position an area of overlap of the slit and the object versus an angle between the slit and the object; wherein an algorithm for calculating the area of overlap versus the angle comprises:

$$R(\theta) = \int_0^{2\pi} \int_0^{\infty} rect\left[\frac{r}{r(\theta')}\right] rect\left[\frac{r}{r_{rect}(\theta' + \theta)}\right] rd\, rd\, \theta'$$

where $rect[r/r_{rect}(\theta'+\theta)]$ is the slit rotated by an angle $\theta$, and $rect[r/r(\theta')]$ is the object in the sensor input image.

2. An optical-digital signal processor for extracting a feature from an object in a sensor input image, the signal processor comprising:

an optical processor for extracting the boundary of the object, wherein the optical processor comprises:

a multi-lenslet array for replicating the sensor input image;

a fixed mask containing a series of rotated slits for passing the replicated sensor input images therethrough; and a detector array for receiving the replicated sensor input images and for integrating the superposition of each replicated sensor input image and the corresponding fixed mask slit; and a digital processor for calculating a feature of the object using the extracted boundary of the object.

3. The signal processor as recited in claim 2, wherein the optical processor further comprises a means for generating the Hough transform of the object.

4. The signal processor as recited in claim 3, wherein the Hough transform generating means comprises a means for calculating an annular correlation.

5. The signal processor as recited in claim 4, wherein the annular correlation calculating means comprises a second fixed mask containing a plurality of annuli having different diameters for passing the replicated images therethrough.

6. The signal processor as recited in claim 2, further comprising a zoom lens preceding the optical processor.

7. The signal processor as recited in claim 6, further comprising a microchannel plate for receiving the sensor input image from the zoom lens and forming a real image.

8. The signal processor as recited in claim 2, further comprising an optical interface for transferring the sensor input image to the optical processor.

9. The signal processor as recited in claim 8, wherein the optical interface comprises a means for creating a displayed image.

10. The signal processor as recited in claim 9, wherein the creating means comprises a video display.

11. The signal processor as recited in claim 10, wherein the optical interface further comprises a collimating lens.

12. The signal processor as recited in claim 2, further comprising a neural network for classifying the object using the calculated feature.

13. The signal processor as recited in claim 2, wherein the slits and the object are concentric.

14. The signal processor as recited in claim 2, wherein the slits are radial slits.

15. A method for extracting the boundary of an object in a sensor input image comprising the steps of:

overlapping a slit and the object in the sensor input image;

rotating the slit relative to the object, the slit thereby sampling the entire boundary of the object;

calculating for each rotation position an area of overlap of the slit and the object versus an angle between the slit and the object; and generating a Hough transform of the object comprising calculating an annular correlation.

16. An optical-digital signal processor for extracting a feature from an object in a sensor input image, the signal processor comprising:

a video display;

a collimating lens;

a zoom lens;

a microchannel plate for receiving the sensor input image from the zoom lens and forming a real image;

a multi-lenslet array for replicating the sensor input image;

two fixed masks, a first mask containing a first pattern comprising a series of rotated radial slits and a second mask containing a second pattern comprising a plurality of annuli having different diameters, the first and second fixed masks for passing the replicated images therethrough and extracting the boundary of the object;

a detector array for receiving the replicated images and for integrating the superposition of each replicated image and the corresponding fixed mask patterns; and a digital processor for calculating a feature of the object using the extracted boundary of the object.

* * * * *